US012131603B2

(12) United States Patent
Schoenfelder et al.

(10) Patent No.: US 12,131,603 B2
(45) Date of Patent: *Oct. 29, 2024

(54) SCALABLE SYSTEMS AND METHODS FOR MONITORING AND CONCIERGE SERVICE

(71) Applicant: Latch Systems, Inc., New York, NY (US)

(72) Inventors: Luke Andrew Schoenfelder, New York, NY (US); Michael Brian Jones, New York, NY (US); Saayuj Dhanak, New York, NY (US)

(73) Assignee: Latch Systems, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,409

(22) Filed: Apr. 19, 2023

(65) Prior Publication Data

US 2023/0260351 A1 Aug. 17, 2023

Related U.S. Application Data

(63) Continuation of application No. 17/540,367, filed on Dec. 2, 2021, now Pat. No. 11,663,870, which is a (Continued)

(51) Int. Cl.
*G07C 9/32* (2020.01)
*G07C 9/00* (2020.01)
(Continued)

(52) U.S. Cl.
CPC .......... *G07C 9/32* (2020.01); *G07C 9/00174* (2013.01); *G07C 9/00571* (2013.01); (Continued)

(58) Field of Classification Search
None
See application file for complete search history.

(56) References Cited

U.S. PATENT DOCUMENTS

| | | | |
|---|---|---|---|
| D253,686 | S | 12/1979 | Wooldridge |
| 5,337,043 | A | 8/1994 | Gokcebay |

(Continued)

FOREIGN PATENT DOCUMENTS

| | | | |
|---|---|---|---|
| CN | 101093603 | A | 12/2007 |
| CN | 101136112 | A | 3/2008 |

(Continued)

*Primary Examiner* — K. Wong
(74) *Attorney, Agent, or Firm* — KDW Firm PLLC

(57) ABSTRACT

Disclosed systems and methods relate to a smart access control device in a security system for monitoring an area. According to embodiments, a method can include receiving, by the smart access control device, from one or more sensors in the area, sensor data about the area. The method can also include analyzing the received sensor data and generating an alert for a user about the area based on the analyzed sensor data. The method can further include transmitting, by the smart access control device, a first signal comprising the alert to a monitoring server of the security system. Moreover, the method can include enabling, by the smart access control device, a person requesting access to the area to enter identification information and granting access to the area to the person based on the received identification information that is evaluated by the user.

20 Claims, 11 Drawing Sheets

Related U.S. Application Data continuation of application No. 17/086,225, filed on Oct. 30, 2020, now Pat. No. 11,222,495, which is a continuation of application No. 16/906,221, filed on Jun. 19, 2020, now Pat. No. 10,909,792, which is a continuation of application No. 16/688,205, filed on Nov. 19, 2019, now Pat. No. 10,885,734, which is a continuation of application No. 15/983,058, filed on May 17, 2018, now Pat. No. 10,515,495.

(60) Provisional application No. 62/507,672, filed on May 17, 2017.

(51) Int. Cl.
*G08B 19/00* (2006.01)
*G08B 25/00* (2006.01)

(52) U.S. Cl.
CPC ........... *G08B 19/00* (2013.01); *G08B 25/001* (2013.01); *G08B 25/009* (2013.01); *G07C 9/0069* (2013.01); *G07C 2009/00769* (2013.01)

(56) References Cited

U.S. PATENT DOCUMENTS

| | | | | |
|---|---|---|---|---|
| 5,475,375 | A | 12/1995 | Barrett | |
| D388,308 | S | 12/1997 | Evans | |
| D390,482 | S | 2/1998 | Pasquarette | |
| 6,088,451 | A | 7/2000 | He | |
| D437,771 | S | 2/2001 | Barnes | |
| 6,223,985 | B1 | 5/2001 | DeLude | |
| 6,971,029 | B1 | 11/2005 | Avery, IV | |
| 6,990,444 | B2 | 1/2006 | Hind | |
| 7,367,497 | B1 | 5/2008 | Hill | |
| 8,331,544 | B2 | 12/2012 | Kraus | |
| 8,358,197 | B2 | 1/2013 | Tran | |
| D678,036 | S | 3/2013 | Chen | |
| 8,675,071 | B1 | 3/2014 | Slavin | |
| D709,754 | S | 7/2014 | Lylyk | |
| D722,259 | S | 2/2015 | Conner | |
| 9,437,063 | B2 | 9/2016 | Schoenfelder | |
| D772,692 | S | 11/2016 | Meyerhoffer | |
| D773,281 | S | 12/2016 | Meyerhoffer | |
| 9,666,000 | B1 | 5/2017 | Schoenfelder | |
| D793,205 | S | 8/2017 | Ho | |
| D796,298 | S | 9/2017 | Lylyk | |
| 10,019,860 | B1 | 7/2018 | Kim | |
| 10,083,559 | B2 | 9/2018 | Schoenfelder | |
| D839,761 | S | 2/2019 | Schoenfelder | |
| 10,490,000 | B2 | 11/2019 | Schoenfelder | |
| 10,515,495 | B2 | 12/2019 | Schoenfelder | |
| 10,643,412 | B1 | 5/2020 | Yang | |
| D888,537 | S | 6/2020 | Laurans | |
| D890,754 | S | 7/2020 | Raken | |
| D911,812 | S | 3/2021 | Moyer | |
| D912,493 | S | 3/2021 | Choe | |
| D923,454 | S | 6/2021 | Chen | |
| D927,959 | S | 8/2021 | Meyerhoffer | |
| D927,960 | S | 8/2021 | Meyerhoffer | |
| D945,856 | S | 3/2022 | Meyerhoffer | |
| 11,663,870 | B2 * | 5/2023 | Schoenfelder ....... | G08B 25/009 340/5.51 |
| D991,208 | S | 7/2023 | Sanchez | |
| D1,007,275 | S | 12/2023 | Xia | |
| 2002/0147924 | A1 | 10/2002 | Flyntz | |
| 2002/0184497 | A1 | 12/2002 | Gage | |
| 2003/0081747 | A1 | 5/2003 | Ahlstrom | |
| 2003/0200446 | A1 | 10/2003 | Siegel | |
| 2003/0229492 | A1 | 12/2003 | Nolan | |
| 2004/0036574 | A1 | 2/2004 | Bostrom | |
| 2004/0041019 | A1 | 3/2004 | Schneider | |
| 2007/0143825 | A1 | 6/2007 | Goffin | |
| 2007/0146118 | A1 | 6/2007 | Rodriguez | |
| 2007/0177613 | A1 | 8/2007 | Shorty | |
| 2008/0307531 | A1 | 12/2008 | Falk | |
| 2009/0066476 | A1 | 3/2009 | Raheman | |
| 2010/0141381 | A1 | 6/2010 | Bliding | |
| 2010/0201482 | A1 | 8/2010 | Robertson | |
| 2010/0201536 | A1 | 8/2010 | Robertson | |
| 2011/0197065 | A1 | 8/2011 | Stauth | |
| 2012/0178364 | A1 | 7/2012 | Dobyns | |
| 2013/0024222 | A1 | 1/2013 | Dunn | |
| 2013/0043973 | A1 | 2/2013 | Greisen | |
| 2013/0120109 | A1 | 5/2013 | Libin | |
| 2013/0212254 | A1 | 8/2013 | Galbraith | |
| 2013/0217346 | A1 | 8/2013 | Freeman | |
| 2013/0318249 | A1 | 11/2013 | McDonough | |
| 2013/0318519 | A1 | 11/2013 | Coolidge | |
| 2013/0335193 | A1 | 12/2013 | Hanson | |
| 2014/0051407 | A1 | 2/2014 | Ahearn | |
| 2014/0062656 | A1 | 3/2014 | Bowen | |
| 2014/0247113 | A1 | 9/2014 | Paquin | |
| 2014/0344153 | A1 | 11/2014 | Raj | |
| 2015/0363738 | A1 | 12/2015 | Haci | |
| 2016/0203821 | A1 | 7/2016 | Zeljkovic | |

FOREIGN PATENT DOCUMENTS

| | | | |
|---|---|---|---|
| CN | 102168509 | A | 8/2011 |
| CN | 202531028 | U | 11/2012 |
| CN | 202939691 | U | 5/2013 |
| CN | 103236102 | A | 8/2013 |
| CN | 203271342 | U | 11/2013 |
| CN | 103793960 | A | 5/2014 |
| CN | 103903319 | A | 7/2014 |
| CN | 103997621 | A | 8/2014 |
| CN | 104660979 | A | 5/2015 |
| CN | 104966336 | A | 5/2015 |
| CN | 204905721 | U | 12/2015 |
| CN | 105225305 | A | 1/2016 |
| CN | 105761340 | A | 7/2016 |
| CN | 106373240 | A | 2/2017 |
| CN | 106384285 | A | 2/2017 |
| EP | 3062294 | A1 | 8/2016 |
| JP | 2000322145 | A | 11/2000 |
| JP | 2002366526 | A | 12/2002 |
| JP | 2004272763 | A | 9/2004 |
| JP | 2007141184 | A | 6/2007 |
| JP | 2010198341 | A | 9/2010 |
| JP | 2014215984 | A | 11/2014 |
| JP | 2015052959 | A | 3/2015 |
| KR | 101308103 | B1 | 9/2013 |
| WO | 9630857 | A1 | 10/1996 |
| WO | 2006098690 | A1 | 9/2006 |
| WO | 2012023153 | A1 | 2/2012 |
| WO | 2015130809 | A1 | 9/2015 |
| WO | 2016019474 | A1 | 2/2016 |
| WO | 2016172119 | A1 | 10/2016 |

* cited by examiner

SCALABLE SYSTEMS AND METHODS FOR MONITORING AND CONCIERGE SERVICE

RELATED APPLICATIONS

This application is a continuation of U.S. patent application Ser. No. 17/540,367, filed Dec. 2, 2021, a which is a continuation of U.S. patent application Ser. No. 17/086,225, filed on Oct. 30, 2020 (issue as U.S. Pat. No. 11,222,495 on Jan. 11, 2022), which is a continuation of U.S. patent application Ser. No. 16/906,221, filed on Jun. 19, 2020 (issued as U.S. Pat. No. 10,909,792 on Feb. 2, 2021), which is a continuation U.S. patent application Ser. No. 16/688,205, filed on Nov. 19, 2019 (issued as U.S. Pat. No. 10,885,734 on Jan. 5, 2021), which is a continuation of U.S. patent application Ser. No. 15/983,058, filed on May 17, 2018 (issued as U.S. Pat. No. 10,515,495 on Dec. 24, 2019), which claims priority to U.S. Provisional Application Ser. No. 62/507,672, filed on May 17, 2017. The contents of the aforementioned patent and patent applications are incorporated herein by reference in their entireties.

This application is also related to U.S. patent application Ser. No. 15/342,911, filed on Nov. 3, 2016, and to U.S. patent application Ser. No. 15/601,710, filed on May 22, 2017, the entire contents of both applications are incorporated herein by reference.

BACKGROUND

Traditional local security systems are monitored by professional central monitoring stations. These central monitoring stations have generally been based on telephone line-based communication.

Most local security systems are installed and operated in a standard way as follows. Local sensors and security equipment are installed. A network connection between the local sensors and the security equipment is established. The connection is linked to a central monitoring station. The customer begins paying for service on the security system.

When the local security system triggers an alert, a standard procedure is followed, where the central device of the local security system communicates with the central monitoring station. An operator at the central monitoring station reviews the alert and assesses whether it is a valid alert. The central monitoring station operator then calls the customer to verify the information they are seeing. If the customer says it is a false alarm, they ignore the signal. If the customer says it is a real event or does not respond, the operator dispatches appropriate authorities.

This approach now relies on overly complex technology and human interactions, raising costs to a point where only a small percentage of the population can afford remote monitoring for their local security.

SUMMARY

Systems and methods for a security system are provided. According to embodiments, a method for using a smart access control device in a security system for monitoring an area can include receiving, by the smart access control device, from one or more sensors in the area, sensor data about the area. The method can also include analyzing, by the smart access control device, the received sensor data. The method can also include generating, by the smart access control device, an alert for a user about the area based on the analyzed sensor data. The method can also include transmitting, by the smart access control device, a first signal including the alert to a monitoring server of the security system. The method can also include enabling, by the smart access control device, a person requesting access to the area to enter identification information. The method can also include granting access to the area, by the smart access control device, to the person based on the received identification information that is evaluated by the user.

According to embodiments, the user can be at least one of a resident, a manager, and an operator of a monitoring station.

According to embodiments, the monitoring server of the security system can be configured to transmit a second signal including the alert to at least one of the resident and the manager. In some embodiments, the monitoring server can be further configured to transmit the second signal to the operator of the monitoring station when the at least one of the resident and the manager responds to the alert with a request to transmit the second signal to the operator of the monitoring station or fails to respond to the alert within a predetermined time.

According to embodiments, the monitoring server can be further configured to transmit the second signal to the operator of the monitoring station and at least one of the resident and the manager.

According to embodiments, the method can further include determining that the alert is at least one of an indication of a fire, smoke, a flood, a gas leak, a medical emergency, and a request from a person to gain access to the area.

According to embodiments, the first signal can further include at least a portion of the sensor data.

According to embodiments, the one or more sensors can include at least one of a sensor external to the smart access control device and a sensor within the smart access control device.

According to embodiments, the smart access control device can be configured to transmit the first signal to the monitoring server using at least one of a cellular network, an ethernet connection, a WiFi network, the Internet, and a local area network According to embodiments, the method can further include constructing a mesh network including the smart access control device, at least another smart access control device, and the one or more sensors.

According to embodiments, the method can further include allowing a mobile device of the person requesting access to the area to join the mesh network, when the mobile device is within range of the smart access control device or the at least another smart access control device based on credentials stored on the mobile device.

According to embodiments, the method can further include recording, by at least one of the one or more sensors, an activity of the person, when the person is in the area.

According to embodiments, the at least one of the one or more sensors can include at least one of a video recorder and a voice recorder configured to provide a live feed.

According to embodiments, the method can further include transmitting, by the smart access control device, the recorded activity of the person to a monitoring device.

According to embodiments, the monitoring device can be a mobile device.

According to embodiments, a method for using a smart access control device in a security system for monitoring an area can include receiving, by the smart access control device, a request from a user to gain access to the area. The method can also include transmitting, by the smart access control device, the received request to at least one of a monitoring server and an operator of a monitoring station. The method can also include providing, by the smart access control device, an identify check procedure to the user. The method can also include receiving, by the smart access control device, a response to the identity check procedure from the user. The method can also include transmitting, by the smart access control device, the received response to the at least one of the monitoring server and the operator of the monitoring station. The method can also include receiving, by the smart access control device, from the at least one of the monitoring server and the operator of the monitoring station, a determination to grant the access to the area to the user, based on the response from the user. The method can also include granting, by the smart access control device, the access to the area to the user.

According to embodiments, the identity check procedure can include at least one of posing a question about personally identifiable information to the user and requesting the user to speak a pre-analyzed phrase into a microphone of the smart access control device.

According to embodiments, a security system for monitoring an area can include a smart access control device configured to receive, using the one or more transceivers, from one or more sensors in the area, sensor data about the area. The smart access control device can also be configured to analyze the received sensor data. The smart access control device can also be configured to generate an alert for a user about the area based on the analyzed sensor data. The smart access control device can also be configured to transmit a first signal including the alert to a monitoring server of the security system. The smart access control device can also be configured to enable a person requesting access to the area to enter identification information. The smart access control device can also be configured to grant access to the area to the person based on the received identification information that is evaluated by the user.

According to embodiments, the user can be at least one of a resident, a manager, and an operator of a monitoring station.

According to embodiments, the monitoring server can be further configured to transmit a second signal including the alert to at least one of the resident and the manager. The monitoring server can also be further configured to transmit the second signal to the operator of the monitoring station when the at least one of the resident and the manager responds to the alert with a request to transmit the second signal to the operator of the monitoring station or fails to respond to the alert within a predetermined time.

According to embodiments, the smart access control device can be further configured to determine that the alert is at least one of an indication of a fire, smoke, a flood, a gas leak, a medical emergency, and a request from a person to gain access to the area.

According to embodiments, the smart access control device can be configured to transmit the first signal to the monitoring server using at least one of a cellular network, an ethernet connection, a WiFi network, the Internet, and a local area network.

According to embodiments, the security system can further include a mesh network constructed by the smart access control device, at least another smart access control device, and the one or more sensors.

According to embodiments, a mobile device of the person requesting access to the area is enabled to join the mesh network, when the mobile device is within range of the smart access control device or the at least another smart access control device based on credentials stored on the mobile device.

According to embodiments, the smart access control device is further configured to instruct at least one of the one or more sensors to record an activity of the person, when the person is in the area and transmit the recorded activity of the person to a monitoring device.

According to embodiments, the at least one of the one or more sensors can be at least one of a video recorder and a voice recorder configured to provide a live feed.

According to embodiments, a smart access control device in a security system for monitoring an area can include a user interface. The smart access control device can also include a processor configured to receive a request from a user to gain access to the area. The processor can be also configured to transmit the received request to at least one of a monitoring server and an operator of a monitoring station. The processor can be also configured to provide, using the interface, an identify check procedure to the user. The processor can be also configured to receive, using the interface, a response to the identity check procedure from the user. The processor can be also configured to transmit the received response to the at least one of the monitoring server and the operator of the monitoring station. The processor can be also configured to receive a determination to grant the access to the area to the user, based on the response from the user. The processor can be also configured to grant the access to the area to the user.

According to embodiments, the identity check procedure can include at least one of posing a question about personally identifiable information to the user and requesting the user to speak a pre-analyzed phrase into a microphone of the smart access control device.

BRIEF DESCRIPTION OF THE DRAWINGS

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
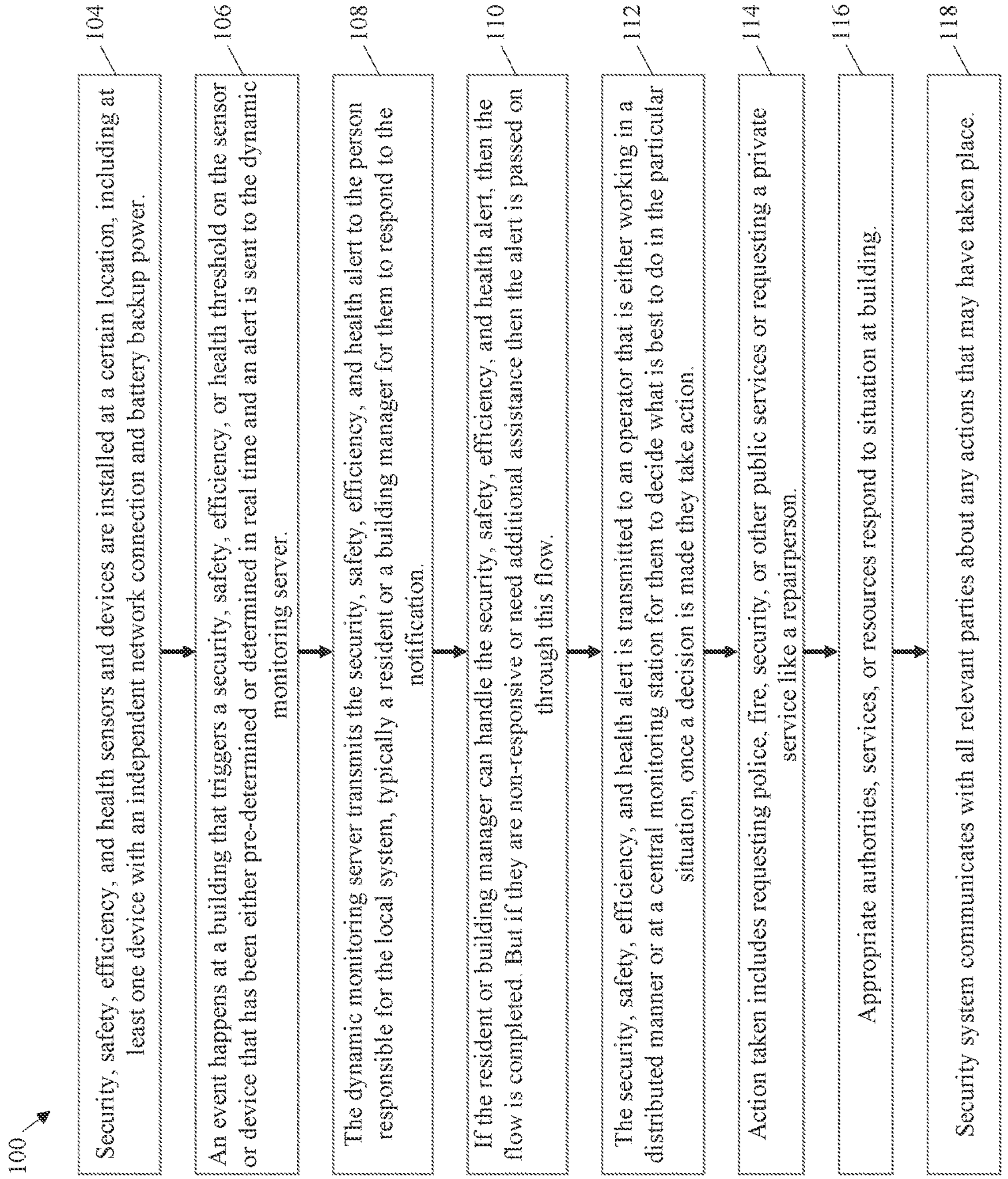
FIG. 1 illustrates an exemplary use case when an event occurs at an area monitored by a security system according to embodiments of the present disclosure.

In the following description, numerous specific details are set forth regarding the systems, methods and media of the disclosed subject matter and the environment in which such systems, methods and media may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems, methods and media that are within the scope of the disclosed subject matter.

The present disclosure relates to a security system for monitoring an area. The security system can include a smart access control device, a collection of local sensors and mobile devices, a monitoring server, a central monitoring station with an operator, and/or any other suitable component for the security system. In some embodiments, the monitoring server can be a dynamic monitoring server. The dynamic monitoring server, for example, can be a monitoring server that can monitor the area as events happen in real time in the area. For example, the dynamic monitoring server's function can be triggered by an event happening in the area. In some embodiments, the dynamic monitoring server can be an artificial intelligent server that can dynamically monitor, analyze, and/or respond to a situation in the area that is monitored by the security system. In other embodiments, the dynamic monitoring server can be a non-artificial intelligent server that can provide the features described herein. In some embodiments, the monitoring server can be a non-dynamic monitoring server (e.g., static monitoring server).

Most buildings currently have some types of security systems that are in accordance with both local laws and practical necessity. However, these security systems are simple in nature and do not include advanced sensors. Disclosed systems and methods can include a smart access control device and advanced sensors. The smart access control device and the advanced sensors can connect with each other or with an external system by using independent networks, e.g., via a cellular network and/or any other suitable network.

According to embodiments, a smart access control device can be installed at an entrance to an area that is being monitored by a security system. For example, a smart access control device can be installed at the main door of an apartment unit to provide a locking mechanism. The installed smart access control device at the door can control user access by granting access when the user is authenticated. The smart access control device can also notify the security system whether the user is authenticated and/or when it suspects any unusual activity. In some embodiments, the user can use a smartphone or another personal device to request access at the smart access control device. For example, the user can enter a passcode on the smartphone, which can then transmit the passcode to the smart access control device for authentication. If the smart access control device authenticates the passcode, the smart access control device can grant access to the user by, for example, unlocking the door lock. In some embodiments, the user can directly enter authentication information, e.g., the user's passcode, the user's voice, or the user's face, into the smart access control device via one or more sensors, some of which can be part of the smart access control device. When the smart access control device grants the requested access, other sensors and devices in the security system can be disarmed or notified about the user's presence so to avoid false alerts.

According to embodiments, a smart access control device can include a lock, a speaker, a battery, one or more antennas, and/or one or more sensors, e.g., a keypad, a motion detector, a camera, and a microphone. The one or more antennas can allow the smart access control device to communicate locally with other sensors, to connect to the Internet, e.g., via an ethernet or WiFi, and/or to connect to a cellular network. With these communication capabilities, the smart access control device can serve as both a discrete input in the security system, as well as a component that can provide external connectivity for the security system. In some embodiments, the antennas can locally communicate with other sensors, e.g., a camera, a motion sensor, a leak detector, a smoke detector, a fire detector, a gas detector, a mobile device acting as a sensor, and/or any other suitable sensor for the security system, without the need for an Internet connection. In some embodiments, these sensors as well as the smart access control device can have internal battery backup power. Thus, the smart access control device can communicate with these sensors and other devices in the event of a local power failure. In some embodiments, one or more sensors can be included within the smart access control device. In some embodiments, one or more sensors are devices that are external to the smart access control device.

According to embodiments, the smart access control device and/or external sensors can each include one or more communication modules, e.g., a cellular communication module, a telephone communication module, an independent network communication module, for example, one or more transceivers, receivers, and/or transmitters, an Internet communication module, an intranet communication module, and/or any other suitable type of network communication module. In some embodiments, these communication modules can be used to communicate between the smart access control device and the external sensors. For example, the intranet communication module can be used to directly communicate between the smart access control device and one or more of the external sensors. As another example, the cellular communication module can be used to communicate between the smart access control device and an external system or an external device. Yet in another example, the cellular communication module can be used to communicate between an external sensor and an external system or an external device. By supporting various network types, the connection between various components of the security system may not be disrupted even when one network type, e.g., the Internet, becomes unavailable. In some embodiments, the direct communication between two devices can be established via any form of wired networks, e.g., an ethernet, and/or any form of wireless networks, e.g., a Bluetooth network and a Near-field Communication (NFC) network. By providing communication means beyond a local WiFi or ethernet connection for sensors and devices, the security system can be more robust, effective, and flexible during an emergency situation.

While the present disclosure describes certain embodiments using specific implementations, disclosed systems and methods are not limited to such specific implementations. For example, the security system may be described as using the cellular communications module, other communication modules can be used in place of the cellular communication module. As another example, while the smart access control device is described as the device that connects to an external server, e.g., a dynamic monitoring server, any other device or sensor that has network capability can instead be used to connect to the external server. Yet in another example, while certain embodiments are described using a specific sensor type, such embodiments are not limited to using that specific sensor.

According to embodiments, a sensor can be a leak monitoring sensor that can detect a water leak, a flood, and/or any other water-related issues. These water-related issues can cause damage to buildings and/or pose danger to residents. In some embodiments, a sensor can be a smoke sensor that can detect a fire or a carbon monoxide sensor that can detect a dangerous level of carbon monoxide in the air. In some embodiments, a sensor can be a door/window sensor that can detect when a door or window opens. The door/window sensor can alert appropriate parties if the detected event was unexpected. In some embodiments, a sensor can be a motion sensor that can detect a movement in an area, e.g., a movement of a human, an animal, and/or any other moving object. The movement information can be used for security, safety, monitoring, and/or utilization tracking purposes. In some embodiments, a sensor can be a camera used for capturing a video, a still image, and/or infrared information of an area. Information can be captured via a camera for safety, efficiency, and/or security reasons. In some embodiments, a sensor can be a microphone used for capturing audio. Any other suitable sensor type can be used within the security system.

According to embodiments, the security system can locally connect mobile devices with the smart access control device and other sensors in an environment as part of a local mesh network. This local mesh network can then communicate with outside parties through the independent network connection of the smart access control device and/or through the independent network connection of the mobile devices. In some embodiments, the local mesh network can provide a backup mechanism in the event of an emergency. For example, if the smart access control device transmits information to an external server via the Internet but when the connection to the Internet fails, the smart access control device can transmit the information to a mobile device of the local mesh network. The mobile device can then transmit the information to the external server via its own independent communication network, e.g., a cellular communication network. Thus, with the mobile devices and the smart access control device still performing their information gathering functions and connected via a local mesh network, the independent network communication from any one of the mobile devices can be used to make connection with a remote monitoring entity as necessary to maintain the safety, security, and efficiency of an environment.

According to embodiments, mobile devices can include mobile computers, mobile phones, smartphones, PDAs, tablet devices, wearable devices, and/or any other mobile devices. The mobile devices described in this disclosure can include innumerable embodiments of mobile devices. These mobile devices can communicate with local devices and/or sensors via a local network, e.g., Bluetooth and NFC, and/or any other suitable type of network. The network communication can be made via a wired and/or wireless connection. These mobile devices typically have internal batteries that allow them to function for some period of time even in the event of a local power failure.

According to embodiments, mobile devices of certain groups of people can serve as the first line of notification or alert from the security system. Such people can include residents and building managers. In some embodiments, with the mobile devices connected to the security system, alerts can first be viewed and interpreted by a person associated with the building before needing to go to a central monitoring station. Such a person can indicate that the alert is a false alarm or a false sensor reading. Consequently, in many instances, alerts to the central monitoring station can be avoided, reducing the cost of the security system and reliance on the central monitoring station. Moreover, an authorized person with a mobile device can remotely oversee a delivery or guest entrance, eliminating the need for the particular activity to rely upon another monitoring component. In the present disclosure, the term "Directly-Responsible Individual" (DRI) is used to refer to one or more persons who can first receive a notification or alert from the security system. For example, the DRI can be residents and/or building managers. In some embodiments, the DRI can respond to the notification or alert before the notification or alert is passed to an operator of a monitoring station.

According to embodiments, a smart access control device and/or other devices configured to monitor a local environment can send a signal comprising an alert to a dynamic monitoring server. The dynamic monitoring server can be located remotely from the local environment. The dynamic monitoring server can initially receive and process the signal. For example, the dynamic monitoring server can determine the source of the signal, the type of the alert within the signal, and/or a course of action associated with the alert. The dynamic monitoring server can send the signal to one or more people or entities in a group, e.g., residents, building managers, operators of monitoring stations, and/or any other suitable people or entities that can handle the situation. These people can assess whether the event associated with the alert is a real emergency or a false alarm. In some embodiments, if the resident or building manager indicates that the alert is a false alarm, the security system can be reset, and no further action would be required. In some embodiments, the security system can be configured such that a signal cannot be overridden, marked as a false alarm, and/or be prevented from requiring a further action by the dynamic monitoring server. For example, if the alert indicates a fire, the security system can be configured such that residents cannot mark it as a false alarm. The same security system can, however, allow building managers and/or operators of a monitoring station to mark it as a false alarm. In some embodiments, if the event associated with the alert is determined to require a further action from the security system, the dynamic monitoring server can route the signal to an appropriate actor, such as an operator of a monitoring station, within the security system.

According to embodiments, signals can be routed to remote human operators who are working from their own home or place of business without the need for them to be present in a physical monitoring center. In some embodiments, the signals can also be routed to a human operator in a central monitoring station, and/or an artificially intelligent operator. In some embodiments, the artificially intelligent operator can be operating locally, e.g., at or near the area being monitored, and/or as part of a server configuration, e.g., the same server as the dynamic monitoring server or a different server.

According to embodiments, a distributed network of mobile devices and/or other computing devices can serve as monitoring station terminals. Remote human operators can receive whatever signal is securely sent and respond in an on-demand way on their mobile or other computing devices. In some embodiments, the remote human operators can accept or ignore requests for service. This on-demand response model can enable greater flexibility within the security system and can help load balance the need for additional human resources in peak times and fewer human resources during slow times. In some embodiments, such remote human operators receiving the signal in an on-demand way can be called dynamic operators. In some embodiment, there can be a core of operators that could be called upon at all times, where those operators do not receive the signal in an on-demand way.

According to embodiments, human operators at a central monitoring station can perform functions that are too complex or too sensitive for a distributed operator, dynamic operator, and/or an artificial intelligence operator. In some embodiments, the central monitoring station can use artificial intelligence to filter, sort, elevate, and/or prioritize information that requires human decision making, aiding human operator to make the best possible decision. In some embodiments, an artificial intelligence operator can automate processes and/or provide a customized course of action.

Disclosed systems and methods provide not only improved security and safety features for a building but can also provide new features that may or may not relate to security and safety. For example, when a student returns to an apartment building or an apartment unit, the student's parent or guardian can be notified. As another example, an office building or a hotel can use a remote receptionist, who can greet guests and grant them access to the building. Yet in another example, restaurants can use a remote operator to interact live with a supply delivery person when no one is locally at the restaurant, allowing them to receive deliveries without needing to have local staff present. And, yet in another example, a home rental service, e.g., an Airbnb service, can use a remote concierge for guests, where the remote concierge can provide check-in instructions and ensure that the guest has everything for their stay.

FIG. 1 illustrates an exemplary use case 100 when an event occurs at an area monitored by a security system according to embodiments of the present disclosure. At step 104, sensors and/or devices, e.g., those related to security, safety, efficiency, and/or health, can be installed at a certain location. The certain location can be at a building. For example, a smart access control device can be installed at the main door of an apartment unit to provide security to the apartment unit from external access. The smart access control device can keep the door locked until an authorized user unlocks the door by, for example, providing authentication information from the user's mobile device wirelessly and/or using an authorized proximity card near the smart access control device. As another example, a smoke sensor can be installed on the ceiling of a bedroom. The smoke sensor can be connected, e.g., wirelessly, to the smart access control device in order to transmit sensed information. The sensed information can include a smoke level. In some embodiments, at least one device can use an independent network connection. In some embodiments, at least one device can use a battery as backup power.

At step 106, an event can happen at the building, triggering a security, safety, efficiency, health, and/or any other relevant threshold on the sensor and/or device. The threshold can be either pre-determined or determined in real time. When the threshold is triggered, an alert can be sent to a dynamic monitoring server. For example, a carbon monoxide sensor can be pre-programmed with a pre-determined threshold level of carbon monoxide in the air—the level that can be dangerous for humans. If the carbon monoxide sensor detects that the air contains at least the threshold level of carbon monoxide in the air, the carbon monoxide sensor can send an alert to the smart access control device. The smart access control device can then send the alert to the dynamic monitoring server. As another example, an energy efficiency sensor can determine in real time whether the current usage of energy is efficient. Since the efficiency can depend on various factors, e.g., the current temperature, humidity, and/or any other relevant factor, the triggering threshold can be set in real time based on the current conditions.

At step 108, the dynamic monitoring server can transmit the alert related to security, safety, efficiency, and/or health to the Directly-Responsible Individual (DRI) for the DRI to respond to the alert. The DRI can be someone who is responsible for the local system. For example, the DRI can be a resident and/or an owner of the apartment unit that is being monitored by the security system. The DRI can also be a building manager of the apartment.

At step 110, if the DRI can handle the security, safety, efficiency, and/or efficiency alert, then the flow of this use case 100 can be completed. However, if the DRI is non-responsive and/or needs additional assistance, then the alert can be passed on through this flow.

At step 112, the security, safety, efficiency, and/or health alert can be transmitted to an operator of a monitoring station. The operator can be working in a distributed manner and/or at a central monitoring station. The operator can decide what is best to do in the particular situation. Once a decision is made, the operator can take an action. In some embodiments, the operator can be a human. In some embodiments, the operator can be a computer system with artificial intelligence.

At step 114, the action taken can include requesting public and/or private services, e.g., police, fire department, emergency medical responder (EMS), security, and/or repairperson. The action taken can correspond to the alert type. For example, if a health sensor transmitted an alert that a resident had a stroke, then the EMS would be called. As another example, if a water leak sensor transmitted an alert that water is leaking in a resident unit, a repairperson would be called.

At step 116, appropriate authorities, services, and/or resources can respond to the situation at the building. For example, if the police were called, the police can arrive at the area being monitored by the security system. In some embodiments, the smart access control device can provide access to the area to appropriate authorities.

At step 118, the security system can communicate with some or all relevant parties about any actions that may have taken place. For example, if the fire department was called to extinguish a fire in an apartment unit, the apartment building manager and/or the apartment unit resident can be notified of the action taken via their personal devices, e.g., mobile devices.

Figure 2:
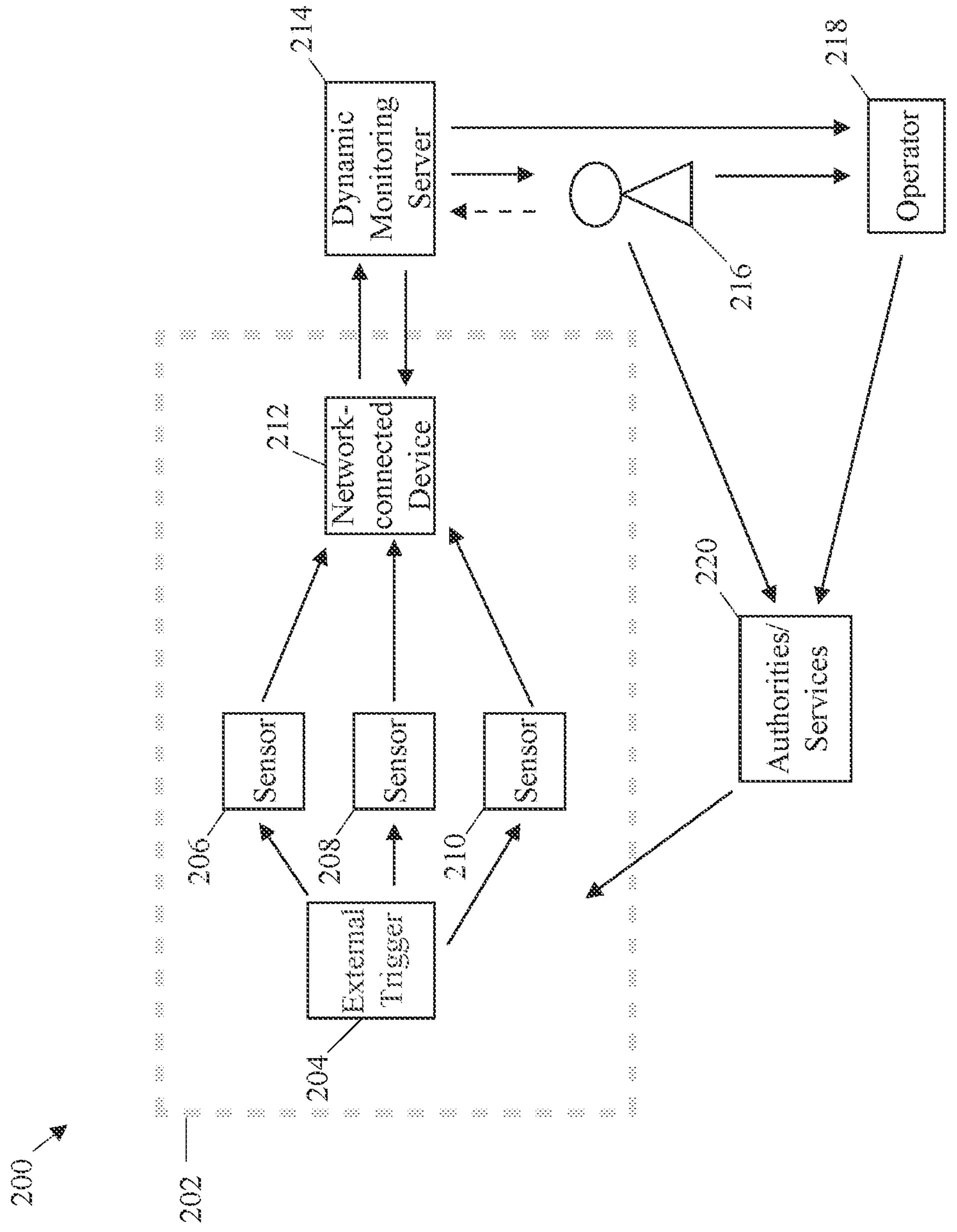
FIG. 2 illustrates a security system in accordance with embodiments of the present disclosure.

FIG. 2 illustrates a security system 200 in accordance with embodiments of the present disclosure. The security system 200 can include an interior environment 202, e.g., inside of a building, with an external trigger 204, sensors 206, 208, 210, and a network-connected device 212. In some embodiments, the network-connected device 212 can be a smart access control device that is installed at a door, e.g., the main door. The external trigger 204, for example, can be an environmental disaster, such as a fire, smoke, a flood, a gas leak, or any other events that can affect the interior environment 202; or it can be a medical emergency, e.g., a cardiac arrest, a heart attack, a seizure, or any other risk to a person's life or health. In some embodiments, the external trigger can be a guest or a visitor arriving at the outside of the interior environment 202, as described in connection with FIGS. 4-6. In some embodiments, the external trigger 204 can be a resident being locked out of the interior environment 202, as described in connection with FIGS. 7-9.

According to embodiments, the sensors 206, 208, and/or 210 can be configured to detect the external trigger 204 and transmit sensor data to the network-connected device 212. Although FIG. 2 illustrates three sensors, the total number of sensors in the security system 200 can vary according to different embodiments.

Figure 4:
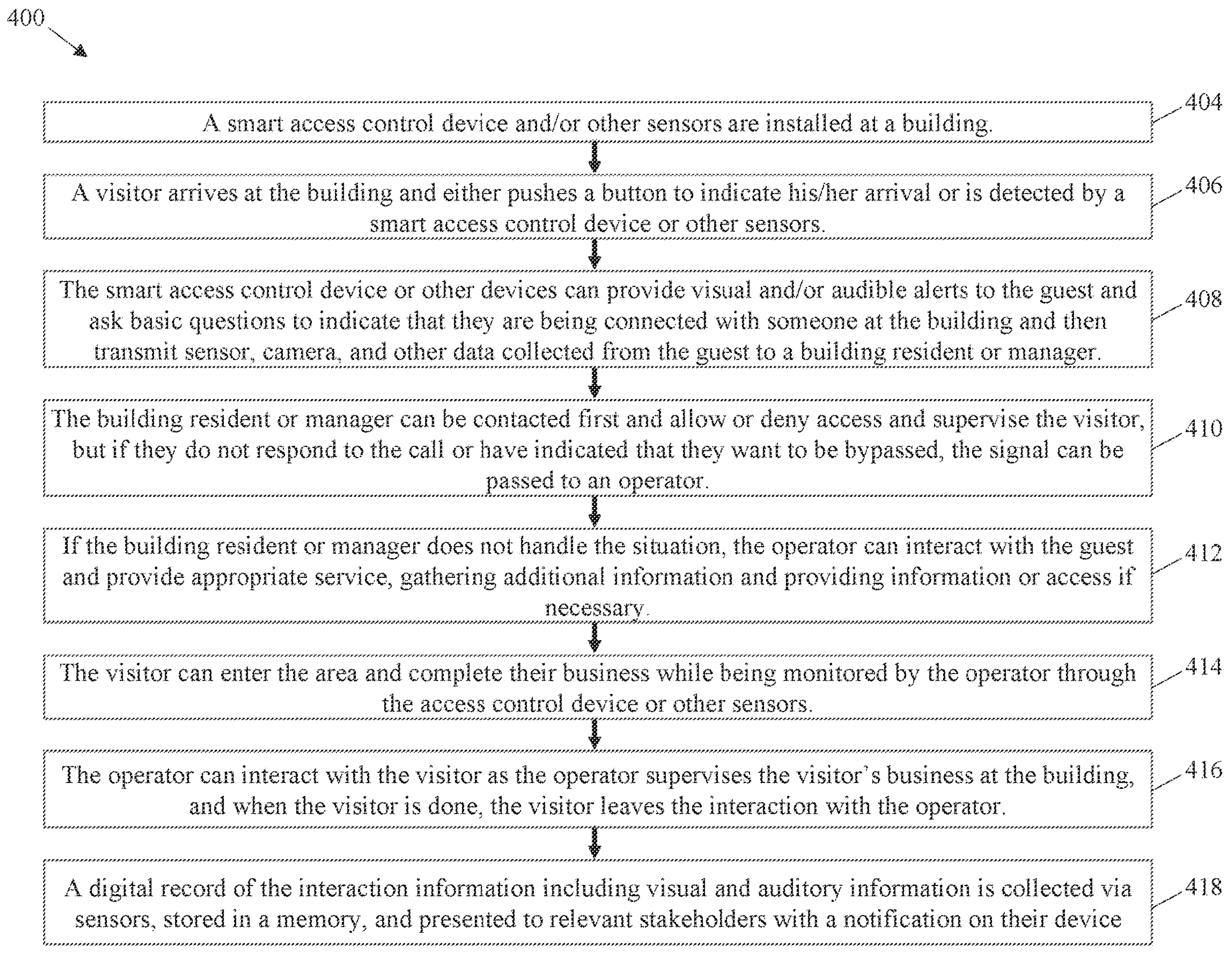
FIG. 4 illustrates an exemplary use case when a visitor requests access to an area monitored by a security system according to embodiments of the present disclosure.
Figure 5:
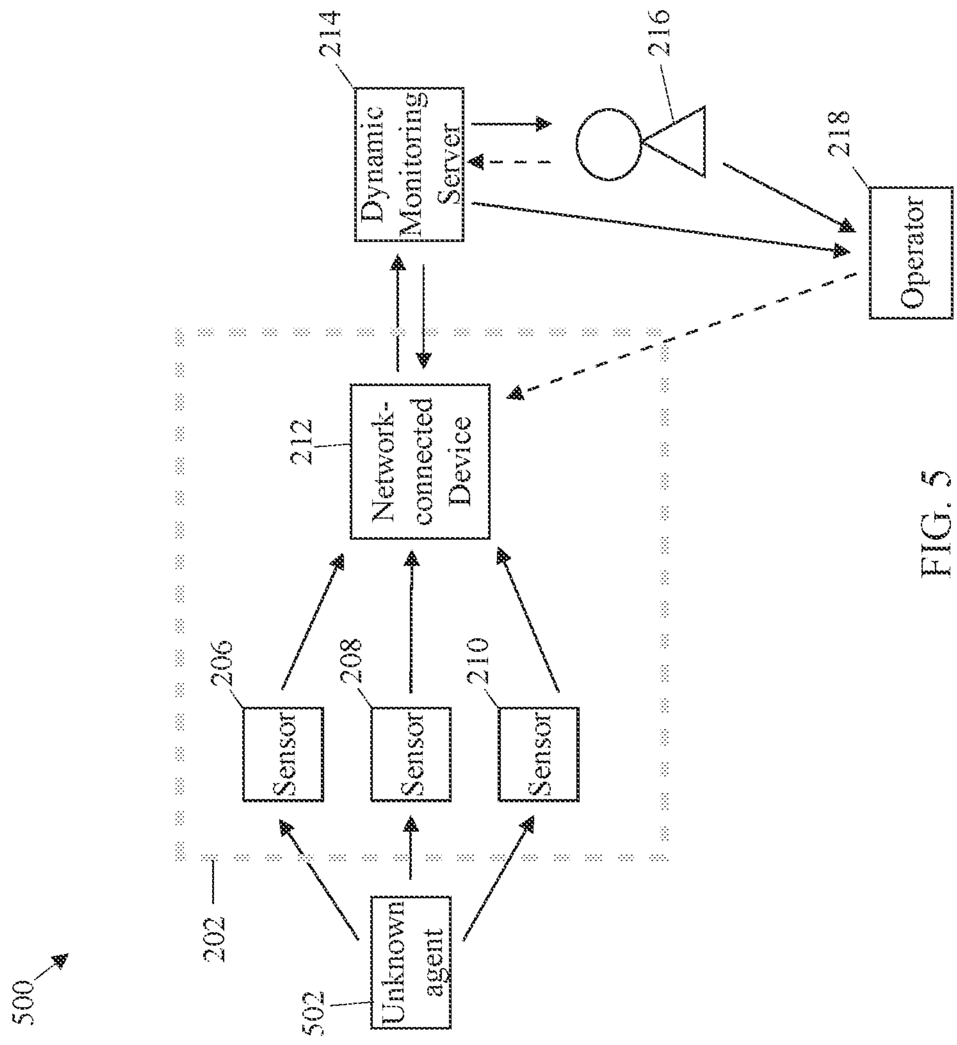
FIG. 5 illustrates a system diagram when an unknown agent is outside an interior environment that is monitored by a security system in accordance with embodiments of the present disclosure.
Figure 6:
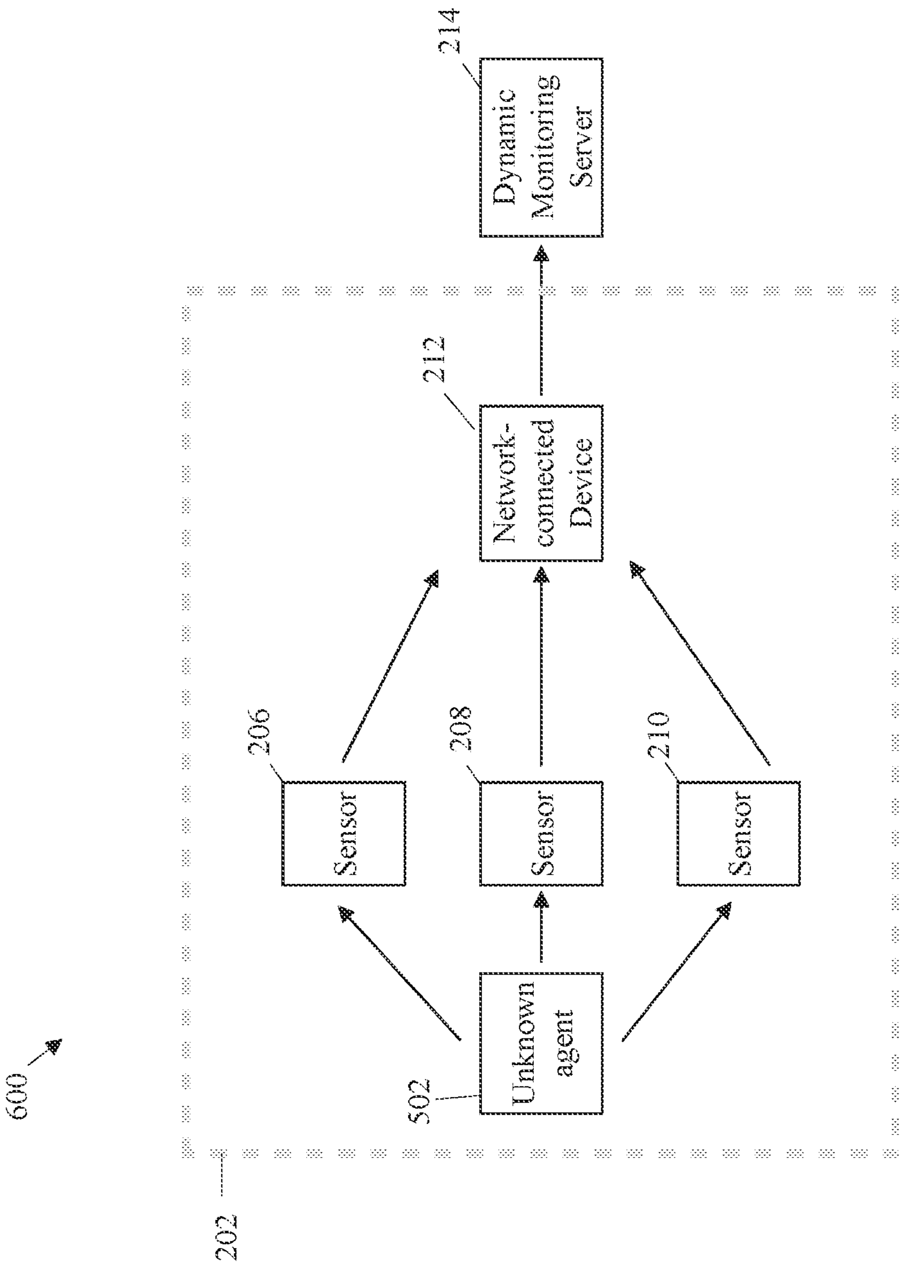
FIG. 6 illustrates a system diagram when an unknown agent is inside an interior environment that is monitored by a security system in accordance with embodiments of the present disclosure.

According to embodiments, the network-connected device 212 can include one or more transceiver, a processor, and/or a memory storing instructions or a program. In some embodiments, the network-connected device 212 can analyze the received sensor data, for example, using the processor executing the instructions and/or the program. The network-connected device 212 can analyze the sensor data to generate an alert. For example, the alert can be any of the possible external trigger 204 as stated above. In some embodiments, the alert can be an indication that a guest or a visitor has arrived at the outside of the interior environment 202, as illustrated in FIGS. 4-6.

According to embodiments, the network-connected device 212 can send the alert to a dynamic monitoring server 214. In some embodiments, the network-connected device 212 can send the sensor data to the dynamic monitoring server 214. The network-connected device 212 can also be configured to send only the sensor data, only the alert, or both to the dynamic monitoring server 214. In some embodiments, the network-connected device 212 can be configured to also function as the dynamic monitoring server 214.

According to embodiments of the present disclosure, the dynamic monitoring server 214 can include one or more transceiver, a processor, and/or a memory that can store instructions. The dynamic monitoring server 214 can be configured to send the alert to a directly-responsible individual (DRI) 216. The dynamic monitoring server 214 can send the alert in various forms. For example, the alert can be a text form, e.g., an email or a text message; the alert can be an audio form, e.g., an automated telephone call, an audio message, or a live audio feed; the alert can be an image form, e.g., a picture, an image, and/or an icon; the alert can be a video form, e.g., a live video feed and/or a recorded video. The DRI 216 can receive the alert via a personal device, e.g., a mobile device.

The DRI 216, for example, can be a building/home owner, a building/home resident, a building/home manager, and/or any other people selected to receive such alerts. The DRI 216 can assess the alert and take appropriate actions necessary to address the external trigger 204. The DRI 216, for example, can alert appropriate authorities/services 220, e.g., police, firefighter, EMS, doctor, security agent, repair service agent, and/or any other suitable person or entity. In the event the DRI 216 determines the alert to be a false alarm, the DRI 216 can disarm and/or reset the security system 200.

In the event that the DRI 216 does not respond to the alert from the dynamic monitoring server 214 within a certain time period, the dynamic monitoring server 214 can send the alert to an operator 218 of a monitoring station. In some embodiments, the certain time period can be predetermined to be any amount of time, e.g., 30 seconds, 1 minute, 10 minutes, 15 minutes, 30 minutes, 1 hour, 2 hours, 6 hours, 12 hours, or any other suitable time for the situation. In some embodiment, the predetermined time can vary depending on the situation. In some embodiments, if the DRI 216 needs additional assistance to address the external trigger 204, the dynamic monitoring server 214 can transmit the alert to the operator 218. For example, the DRI 216, upon receiving the alert, can respond with an indication that additional assistance is needed. In some embodiment, the dynamic monitoring server 214 can determine, without the DRI 216's indication, that additional assistance is needed. In this case, the dynamic monitoring server 214 can transmit the alert to the operator 218. In some embodiments, the dynamic monitoring server 214 can also transmit the raw sensor data to the DRI 216 and/or the operator 218. For example, if the sensor data includes video recording, the DRI 216 and/or the operator 218 can receive the sensor data to view the video recording in order to assess the situation at the interior environment 202.

In some embodiments, the dynamic monitoring server 214 can be configured such that the DRI 216 cannot disarm certain alerts, mark certain alerts as false alarms, or prevent the alerts from being routed to the operator 218. In some embodiments, this configuration can be based on the situation and the nature of the alerts.

In some embodiments, the operator 218 can be a person working at a place of business, e.g., a central monitoring station, or at any other locations. In some embodiments, the operator 218 can be artificial intelligence. In some embodiments, the operator 218 can be a dynamic operator, receiving the transmitted alert on demand. The operator 218 can assess the alert and take an appropriate action as necessary to address the external trigger 204. The operator 218, for example, can alert appropriate authorities/services 220, e.g., police, firefighter, emergency medical responder (EMS), doctor, security agent, repair service agent, etc. The appropriate authorities 220, upon receiving the alert directly from the operator 218 and/or from the DRI 216, can physically enter the interior environment 202 to deal with the external trigger 204.

Figure 3:
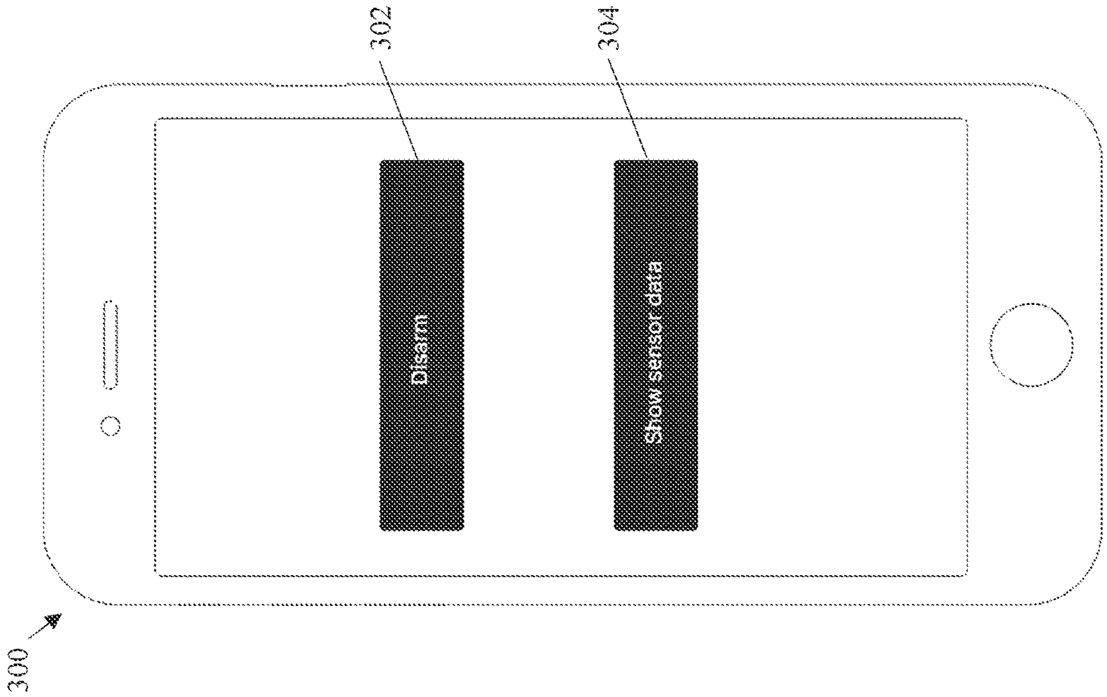
FIG. 3 illustrates an exemplary user interface for an actionable digital alert on a device of a Directly-Responsible Individual (DRI) in accordance with embodiments of the present disclosure.

FIG. 3 illustrates an exemplary user interface for an actionable digital alert on a device 300 of a Directly-Responsible Individual (DRI) 216 (FIG. 2) in accordance with embodiments of the present disclosure. Upon receiving an alert from the dynamic monitoring server 214, the DRI 216 can, for example, disarm the security system by selecting a "Disarm" option 302. The DRI 216 can also select a "Show sensor data" option 304 to further assess the sensor data. The “Show sensor data” option 304 can show various forms of sensor data. For example, the sensor data can be a video feed from a camera sensor, an audio feed from an audio sensor, smoke detection from a smoke detector, gas detection from a gas detector, and/or detection of an open door/window from a door/window sensor. In some embodiments, the user interface can include an option to route the alert and/or sensor data to the operator 218 (FIG. 2).

FIG. 4 illustrates an exemplary use case 400 when a visitor requests access to an area monitored by a security system according to embodiments of the present disclosure. At step 404, a smart access control device can be installed at a building. In some embodiments, other devices and/or sensors can also be installed at the building.

At step 406, a visitor can arrive at the building, where the visitor requests to gain access. In some embodiments, the visitor can indicate the arrival by taking an action that can be detected by the smart access control device and/or other sensors. For example, the visitor can push a button, e.g., a bell connected to the smart access control device, and/or can speak into a microphone, e.g., the microphone of the smart access control reader. In some embodiments, the smart access control device can detect the visitor’s arrival. For example, a motion sensor or a camera can detect the visitor’s movement.

At step 408, the smart access control device and/or other devices can provide visual and/or audible alerts to the visitor and ask questions. The questions, for example, can be a question about the visitor’s identity, the visitor’s purpose of the visit, and/or any other relevant information about the visitor. The smart access control device and/or other devices can also indicate to the visitor that the visitor is being connected with someone who can help the visitor. The smart access control device can transmit sensor data collected from the visitor to a building resident, a building manager, and/or any other Directly Responsible Individual (DRI).

At step 410, the DRI can first be notified of the arrival of the visitor. The DRI can then allow or deny the visitor’s access to the area. The DRI can also supervise the visitor during the visitor’s visit. However, if the DRI does not respond to the visitor’s request for access or the DRI indicates that the request to be bypassed, the request can be passed to an operator of a monitoring station.

According to embodiments, the visitor’s request for access can be passed on to a remote human operator, who can respond to the request on demand. For example, a remote human operator can accept or ignore the visitor’s request for access via a mobile device while the remote human operator is working at home. This on-demand response model, as described above, can enable greater flexibility in the monitoring system to help load balance the need for additional human resources in peak times and fewer human resources during slow times.

At step 412, if the DRI does not handle the situation regarding the visitor, the operator can interact with the visitor and provide appropriate service to the visitor. The operator can gather additional information about the visitor via the smart access control device and/or other sensors. The operator can then grant or deny access and/or provide appropriate information to the visitor, as necessary.

At step 414, the visitor can enter the area once the visitor is granted access. The visitor can then perform his/her business in the area, while being monitored by the operator and/or the DRI via the smart access control device and/or other sensors. For example, the operator can monitor the visitor using camera sensors, audio sensors, and/or window/door sensors. In some embodiments, sensor data, e.g., live video feed, from these sensors can be transmitted to the operator and/or the DRI via the smart access control device.

At step 416, the operator can interact with the visitor conducting the business at the building. For example, if the visitor is a repairperson, the operator can instruct the repairperson to perform certain repair steps via a speaker. The interaction between the operator and the visitor can end when the visitor leaves the building.

At step 418, a digital record of the interaction information, e.g., visual and/or auditory information, can be collected via sensors, stored in a memory, and presented to relevant stakeholders. For example, after the repairperson leaves the building, the recorded video of the repairperson can be stored in a memory of a device, e.g., a memory at the smart access control device, and transmitted to the resident of the apartment unit, where the repair was performed. In some embodiments, the interaction information can be transmitted to relevant stakeholders in real time.

FIG. 5 illustrates a system diagram 500 when an unknown agent is outside an interior environment that is monitored by a security system in accordance with embodiments of the present disclosure. In FIG. 5, the same reference numerals as in FIG. 2 have been used for certain components of the security system to indicate that the descriptions provided for these components with respect to FIG. 2 also apply to FIG. 5.

According to embodiments, an unknown agent 502 can arrive at the outside of the interior environment 202. The unknown agent 502, for example, can be a guest, a visitor, a delivery person, a repairperson, a serviceperson, or any other suitable person who may wish to gain access to the interior environment 202. The unknown agent 502 can interact with the sensors 206, 208, 210, which can be configured to detect the presence of the unknown agent 502. In some embodiments, a smart access control device can include one or more of these sensors 206, 208, 210. The sensors 206, 208, 210 can include a push button, such as a bell, which the unknown agent 502 can push to notify his/her arrival. In another example, the sensors 206, 208, 210 can include a camera, a motion sensor, an infrared sensor, and/or any other sensors capable of detecting the presence of the unknown agent 502. The sensors 206, 208, 210 can include a video camera and/or a microphone that are capable of collecting video and/or audio information related to the unknown agent 502. Although FIG. 5 illustrates three sensors, the actual number of sensors may vary according to different embodiments.

According to embodiments, the network-connected device 212 can be a smart access control device. Upon the detection of the unknown agent 502, the sensors 206, 208, 210 can send the sensor data to the network-connected device 212. In some embodiments, one or more of the sensors 206, 208, 210 can be part of the network-connected device 212, in which case no external transmission of sensor data may be necessary. For example, a smart access control device can include a lock, a keypad, a speaker, and sensors, such as a microphone and a video camera. This smart access control can detect the unknown agent 502 using its own camera as one of the sensors 206, 208, 210.

According to embodiments, the network-connected device 212 can be configured to analyze the sensor data and generate an alert based on the sensor data. The network-connected device 212 can send the alert to the dynamic monitoring server 214. The alert can provide information that the unknown agent 502 is present outside the interior environment 202. The alert can include relevant information about the unknown agent 502 in various forms, as described above, including text, audio, and/or video forms. For example, the alert can include a name, a picture, a voice recording, a live audio, a video recording, and/or a live video of the unknown agent 502.

According to embodiments, the network-connected device 212 can be configured to send the sensor data directly to the dynamic monitoring server 214 in addition to the alert. In some embodiments, the network-connected device 212 can be configured to send the sensor data directly to the dynamic monitoring server 214, and the dynamic monitoring server 214 can be configured to analyze the sensor data to generate an alert.

The dynamic monitoring server 214 can be configured to determine and send the alert to the directly-responsible individual (DRI) 216. The DRI 216 can respond by either granting or denying the unknown agent 502's access into the interior environment 202.

In the event that the DRI 216 does not respond to the alert from the dynamic monitoring server 214 within a predetermined time period or in the event that the DRI 216 has indicated a desire to be bypassed, the corresponding alert can be routed to the operator 218 of a monitoring station. In some embodiments, the predetermined time period can be any amount of time, e.g. 30 seconds, 1 minute, 10 minutes, 15 minutes, 30 minutes, 1 hour, 2 hours, 6 hours, 12 hours, or any other suitable time for the situation. In some embodiment, the predetermined time can vary depending on the situation. Upon receipt of the alert, the operator 218 can interact with the unknown agent 502. The operator 218 can analyze the unknown agent 502's information and respond by either granting or denying the unknown agent 502's access into the interior environment 202.

FIG. 6 illustrates a system diagram 600 when an unknown agent is inside an interior environment that is monitored by a security system in accordance with embodiments of the present disclosure. In FIG. 6, the same reference numerals as in FIG. 5 have been used for certain components of the security system to indicate that the descriptions provided for these components with respect to FIG. 5 also apply to FIG. 6.

According to embodiments, the unknown agent 502 can enter the interior environment 202. The sensors 206, 208, 210, such as a video camera, a microphone, and a window/door sensor, can be configured to collect information about the unknown agent 502. The collected information about the unknown agent 502 can be sent to the network-connected device 212 as described above.

According to embodiments, the system 600 can include a memory configured to store the collected information, including video, audio, and/or any other relevant information about the unknown agent 502. For example, the network-connected device 212 and/or the dynamic monitoring server 214 can include a memory and store the collected information of the unknown agent 502. In some embodiments, a monitoring station system can include a memory and can be configured to store the collected information of the unknown agent 502.

According to embodiments, information collection and storage related to the unknown agent 502 can end when the unknown agent 502 leaves the interior environment 202. In some embodiments, a window/door sensor can be used to determine that the unknown agent 502 has left the interior environment 202. Other sensors can also be used in connection with the window/door sensor.

Figure 7:
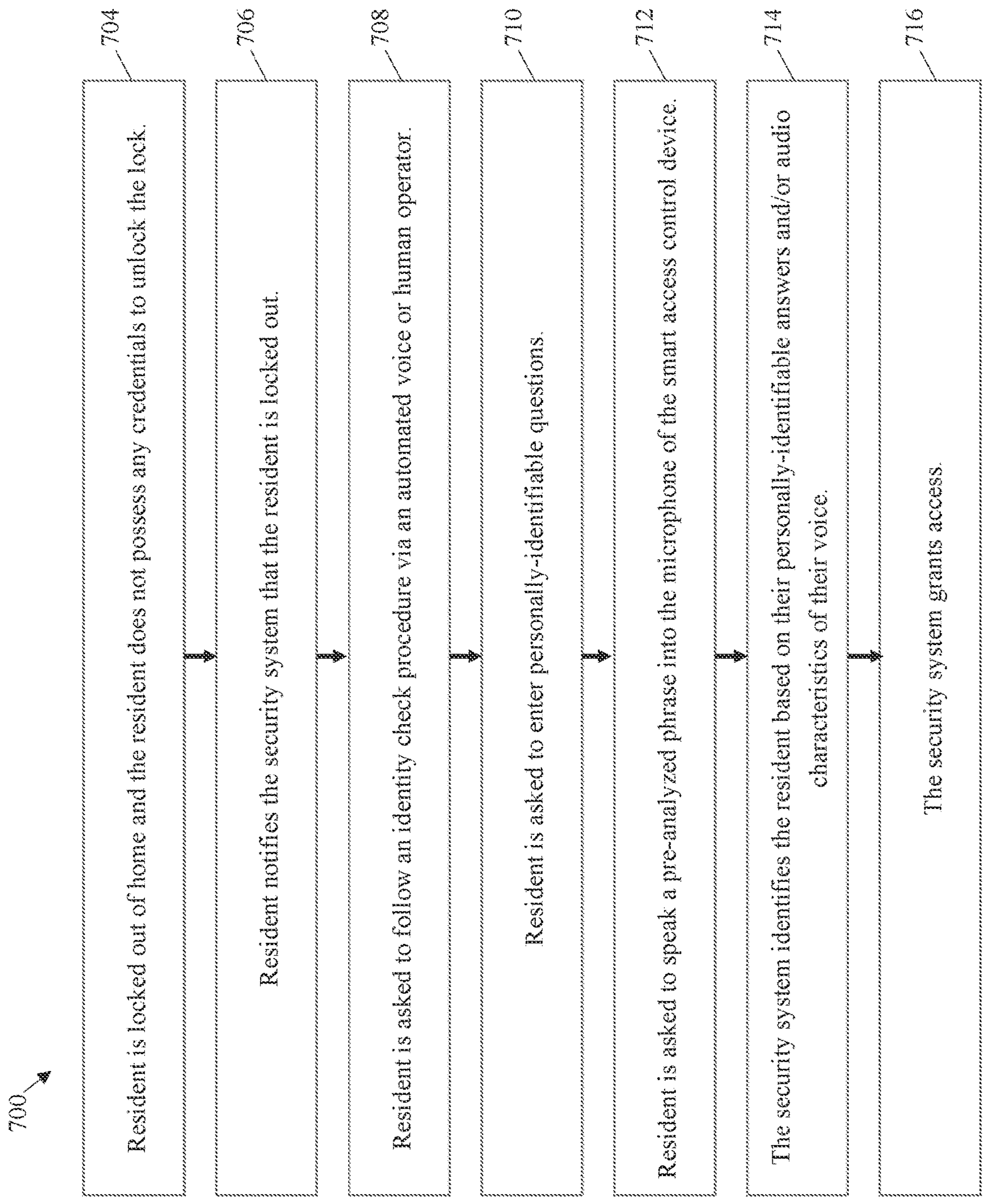
FIG. 7 illustrates an exemplary use case when a resident has been locked out of an area monitored by a security system according to embodiments of the present disclosure.

FIG. 7 illustrates an exemplary use case 700 when a resident has been locked out of an area monitored by a security system according to embodiments of the present disclosure. In some embodiments, the security system can identify a resident locked out of his/her home or other areas that are monitored by the security system. The security system can provide access to the resident by using the resident's information, such as the resident's voice and personal facts.

At step 704, a resident can be locked out of his/her home. The resident does not possess any credentials to unlock the lock. For example, the resident has left his/her access card inside the home.

At step 706, the resident can notify the security system that he/she is locked out. For example, the resident can indicate this by using the microphone on the smart access control device. In some embodiments, the resident can notify his/her locked-out status using a keypad on the smart access control device. For example, the keypad can have a button or a combination of buttons that can be pressed to indicate that the resident has been locked out. In some embodiments, the smart access control device can detect that the resident has been locked out. For example, if the resident incorrectly enters the access passcode for a predetermined number of times or otherwise unsuccessfully attempts to gain access to the home for a certain number of times, the smart access control device can be configured to determine that the resident has been locked out. In some embodiments, the predetermined number of access attempts can be any number, e.g., 3, 5, 10, or any other number of attempts.

At step 708, the resident can be asked to follow an identity check procedure via an automated voice or a human voice through, for example, a speaker on the smart access device. For example, the automated voice can be transmitted from the dynamic monitoring server or an automated system at a monitoring station. As another example, the human voice can be transmitted from a building manager, another resident, an operator of a monitoring station, and/or any other person who is authorized to provide the identity check procedure.

At step 710, the resident can be asked to enter his/her personally identifiable information. For example, the smart access control device can ask questions, such as "what is your birthday?," "what is your social security number?," and "what is your mother's maiden name?" In some embodiments, the resident can enter identifying numerical values, such as a date of birth, a social security number, or any other personally identifiable numerical value, by using, for example, the keypad of the smart access control device. In some embodiments, the resident can enter identifying answers using a microphone of the smart access control device. For example, the resident can provide the answer to the question "what is your mother's maiden name?" by speaking to the microphone.

At step 712, the resident can be asked to speak a pre-analyzed phrase into the microphone of the smart access control device for further verification. For example, the resident may have set up a security feature in the security system that allows the resident to store a phrase in his/her voice in the security system so that the phrase can be used as a verification step when the resident is locked out. The security system can analyze this phrase and compare it to the resident's response when the resident is asked to speak the pre-analyzed phrase.

At step 714, the security system can identify the resident based on the resident's responses to the personally-identifiable questions and/or the question to provide the pre-analyzed phrase. In some embodiments, the identification can be based on the audio characteristics of the resident's voice for identification. In some embodiments, the identification can be performed automatically using artificial intelligence at the dynamic monitoring server and/or the central monitoring station. In some embodiments, the identification can be performed manually by another resident, a building manager, an operator of a monitoring station, and/or any other suitable person authorized to perform identification.

At step 716, the security system can grant or deny access based on whether the identification at step 714 was successful.

While FIG. 7 has been described in the context of a resident being locked out of his/her home, disclosed systems and methods are not limited to such situations. For example, this use case can be applied to any type of area that is being monitored by the security system. As another example, this use case can be applied to non-residents who may be granted access to the area monitored by the security system based on the same or similar identity check procedure.

Figure 8:
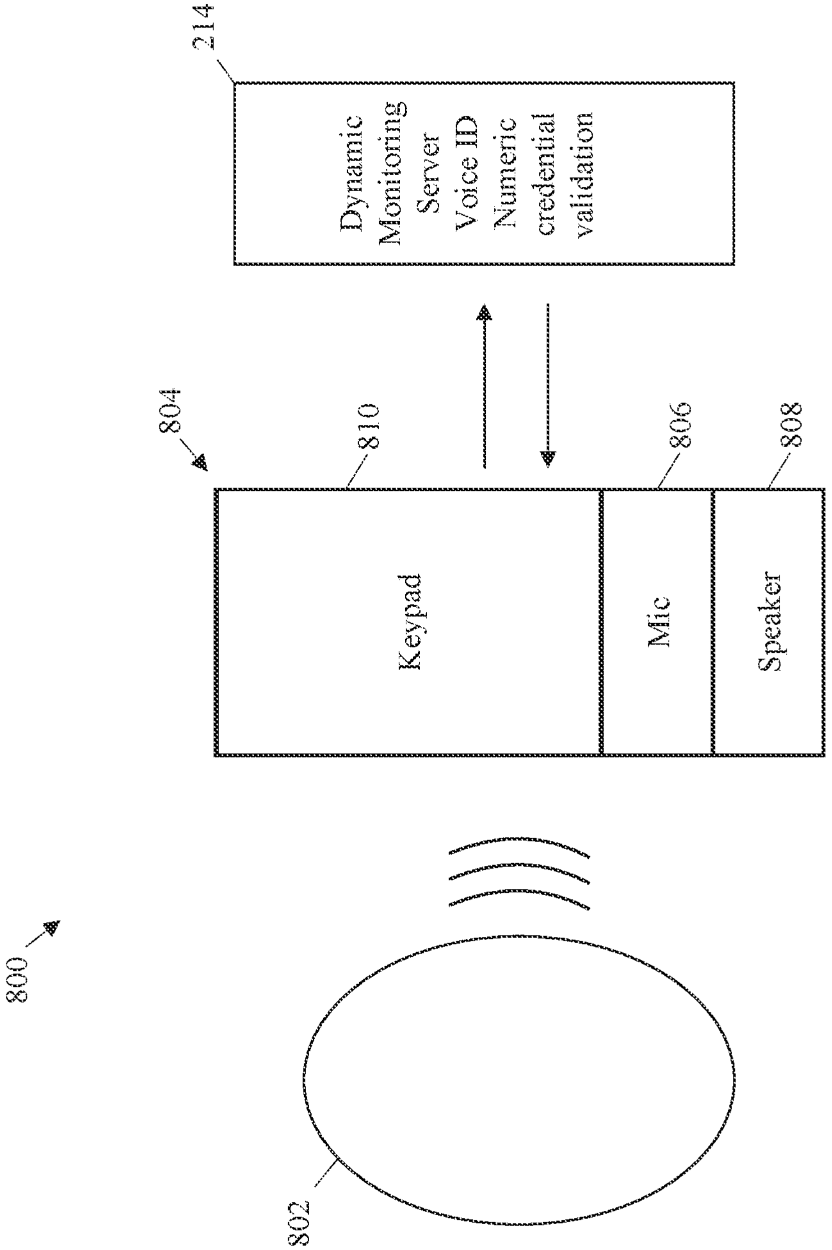
FIG. 8 is a system diagram illustrating components of a security system that provide a solution to an individual who is locked out of an area monitored by the security system according to embodiments of the present disclosure.

FIG. 8 is a system diagram 800 illustrating components of a security system that provide a solution to an individual who is locked out of an area monitored by the security system according to embodiments of the present disclosure. An individual 802 can be a person, who is authorized to enter the area. For example, the area being monitored can be a building with a smart access control device 804. The individual 802 can be a resident of the building but the individual 802 may have been temporarily locked out of the building due to a loss of a key, a keycard, and/or an access code required for access. In this situation, the individual 802 can notify the smart access control device 804 through the microphone 806 that he/she is locked out of the building. For example, the individual 802 can speak into a microphone 806 that he/she has been locked out of the building. As another example, the individual 802 can use a keypad 810 to indicate that he/she has been locked out. In some embodiments, if the individual 802 cannot correctly enter the entry code for a certain number of times or otherwise unsuccessfully attempts to gain access to the building for a certain number of time, the smart access control device 804 can determine that the individual 802 has been locked out.

According to embodiments, the smart access control device 804 can include a processor and a memory with voice recognition instructions to analyze the individual 802's voice. The smart access control device 804 can determine that the individual 802 has been locked out based on his/her voice. For example, the processor executing the voice recognition instruction can analyze the individual 802's voice phrase: “I'm locked out,” “I don't have the key,” “I don't have the key card,” “I forgot the entry access code,” or any other voice phrase that indicates that the individual 802 has been locked out. Upon a determination that the individual 802 has been locked out, the smart access control device 804 can send an alert to the dynamic monitoring server 214 indicating that the individual 802 has been locked out.

According to embodiments, the smart access control device 804 can send raw voice data to the dynamic monitoring server 214. The dynamic monitoring server 214 can include a processor and a memory with voice recognition instructions to analyze the individual 802's voice, and the dynamic monitoring server 214 can determine, based on the individual 802's raw voice data, that he/she has been locked out. In some embodiments, a similar voice recognition mechanism as described above with respect to the smart access control device 804 can be used for the dynamic monitoring server 214.

According to embodiments, the dynamic monitoring server 214 can include a memory storing instructions for an identity check procedure. Based on such instructions executed by the processor, the dynamic monitoring server 214 can be configured to instruct the individual 802, using a speaker 808 of the smart access control device 804, to follow the identity check procedure. For example, the identity check procedure can instruct the individual 802 to enter a numerical value, using the keypad 810, that can verify the individual 802's identity. As discussed above, the numerical value can be the individual 802's birthdate, social security number, and/or any other numerical values that can be used to identify the individual 802.

According to embodiments, the smart access control device 804 can include a memory storing instructions for an identity check procedure. Based on such instructions executed by the processor, the smart access control device 804 can perform the identity check procedure in a similar manner to those discussed above with respect to the dynamic monitoring server 214.

According to embodiments, the individual 802 can be asked to answer personally identifiable questions into the microphone 806 instead of the keypad 810. In some embodiments, both the microphone 806 and the keypad 810 can be used to detect the individual 802's personally identifiable information. In some embodiments, the individual 802 can be asked to speak a pre-analyzed phrase into the microphone 806.

The smart access control device 804 and/or the dynamic monitoring server 214 can analyze the individual 802's response to the identity check procedure and determine the individual 802's identity. When the individual 802 successfully completes the identity check procedure, the smart access control device can grant access to the individual 802.

Figure 9:
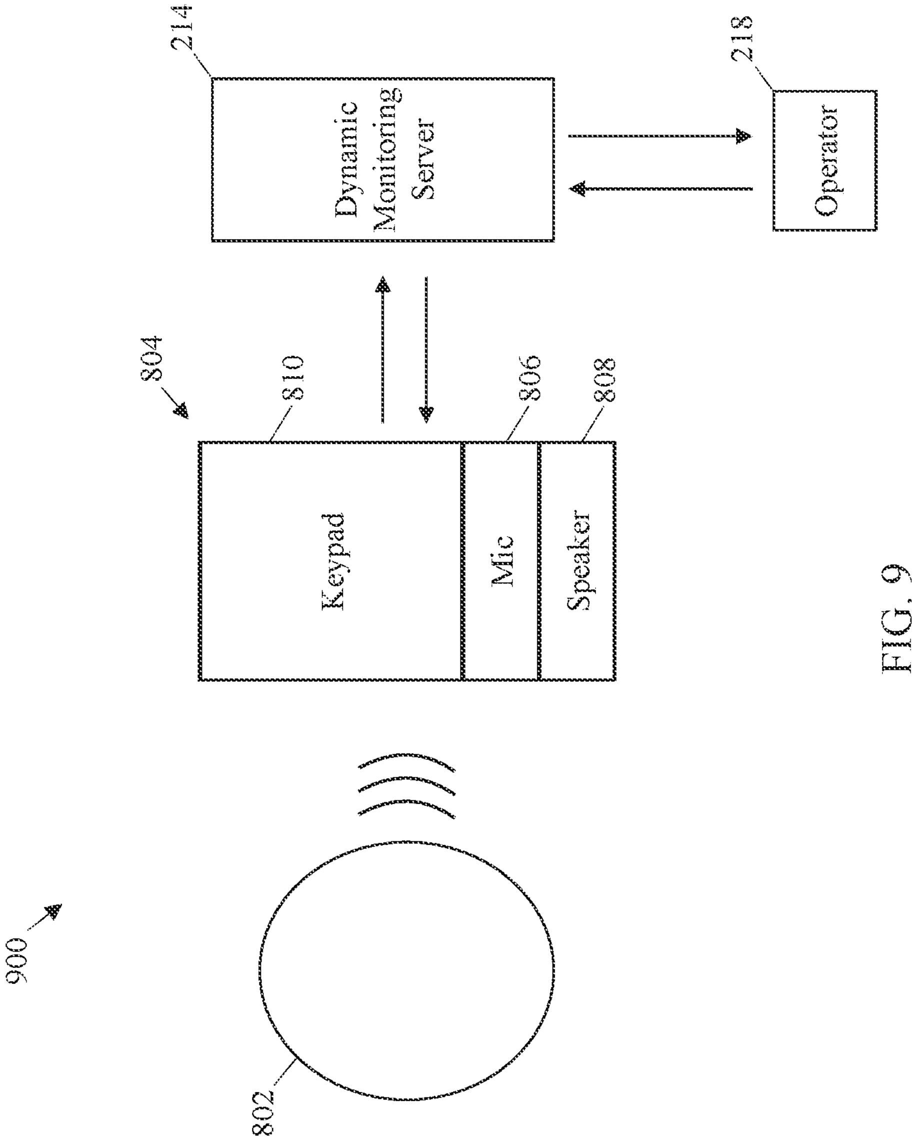
FIG. 9 is a system diagram illustrating components of a security system that provide a solution to an individual who is locked out of an area monitored by the security system according to embodiments of the present disclosure.

FIG. 9 is a system diagram 900 illustrating components of a security system that provide a solution to an individual who is locked out of an area monitored by the security system according to embodiments of the present disclosure. FIG. 9 is similar to FIG. 8 but also shows an operator 218 of a monitoring station. In some embodiments, the dynamic monitoring server 214 can send an alert related to the individual 802 being locked out to the operator 218. The operator 218 can be a human operator or a computer operator, e.g., an artificial intelligent operator. The operator 218 can instruct the individual 802, through the speaker 808 in the smart access control device 804, to follow the identity check procedure. In some embodiment, the operator 218 can be an operator at a central monitoring station or a dynamic operator. Based on the individual 802's response to the identity check procedure, the operator 218 can determine the individual 802's identity and grant access to the building if the individual 802 is authorized to enter the building.

Figure 10:
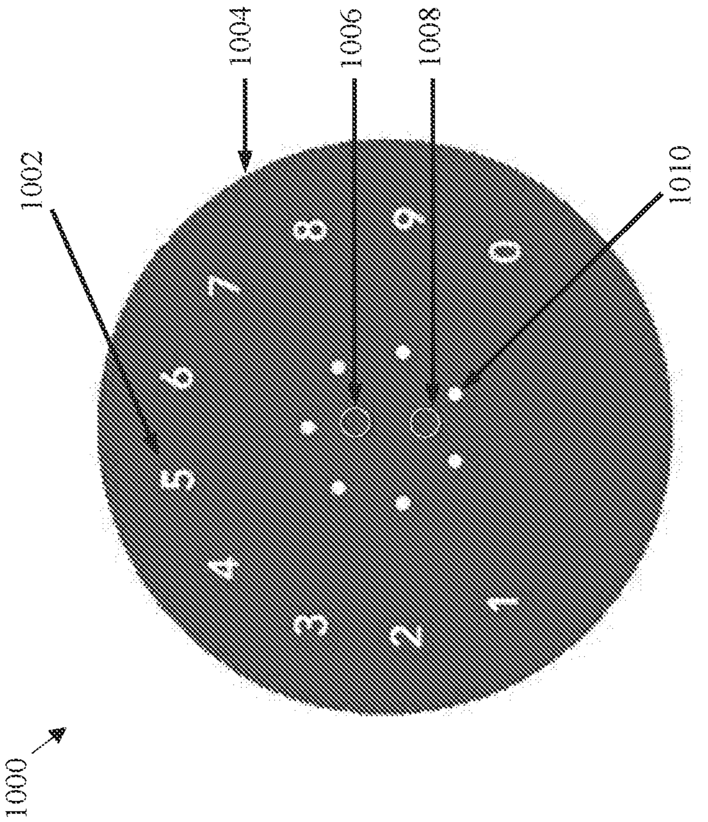
FIG. 10 illustrates a user interface of a smart reader of an exemplary smart access control device in accordance with embodiments of the present disclosure.

FIG. 10 illustrates a user interface 1000 of a smart reader of an exemplary smart access control device in accordance with embodiments of the present disclosure. The user interface 1000 can include various features, for example, a touchpad 1002, wireless support 1004, a camera 1006, an LED indicator 1008, and an LED 1010. The touchpad 1002 can be used for a user to enter an access code. In some embodiments, only a portion of the top surface of the user interface 1000 can be touch-sensitive. For example, only the numbers and areas near these numbers can be touch-sensitive. The wireless support 1004 can provide a user device to connect to the smart reader. The wireless support 1004 can also allow a secondary electronic device to connect and provide authentication mechanisms, e.g., biometric authentication mechanism. Standards and protocols, such as Bluetooth and NFC, can be used to communicate between the smart reader and a user device. The camera 1006 can capture images, videos, and/or audio. In some embodiments, the camera 1006 can be a wide-angle camera. The LED indicator 1008 can provide information about the smart reader. For example, the LED indicator 1008 can indicate different states, for example, no issue, error, low power, no power, standby, and any other state related to various conditions. The LED 1010 can also be used to light the smart reader. For example, the LED 1010 can be used to display input means, as the LED 1010 can illuminate the touchpad 1002 from behind. In some embodiments, the LED 1010 can be turned on only when a user is accessing the smart reader and/or when the smart reader is operating in dark. In some embodiments, the smart reader can include protective coating, e.g., scratch resistant, oleophobic. Although not shown, the smart reader can include and/or connect to, other devices, such as a microphone, a speaker, and/or a video display. The microphone can be used to input a user's voice or detect other types of noise. The speaker can be used to provide information. The video display can be used to provide information. The video display can also be used to enable video chat capability between different parties, for example, between a guest and a resident; between a resident and an operator; and between a resident and a building manager.

Figure 11:
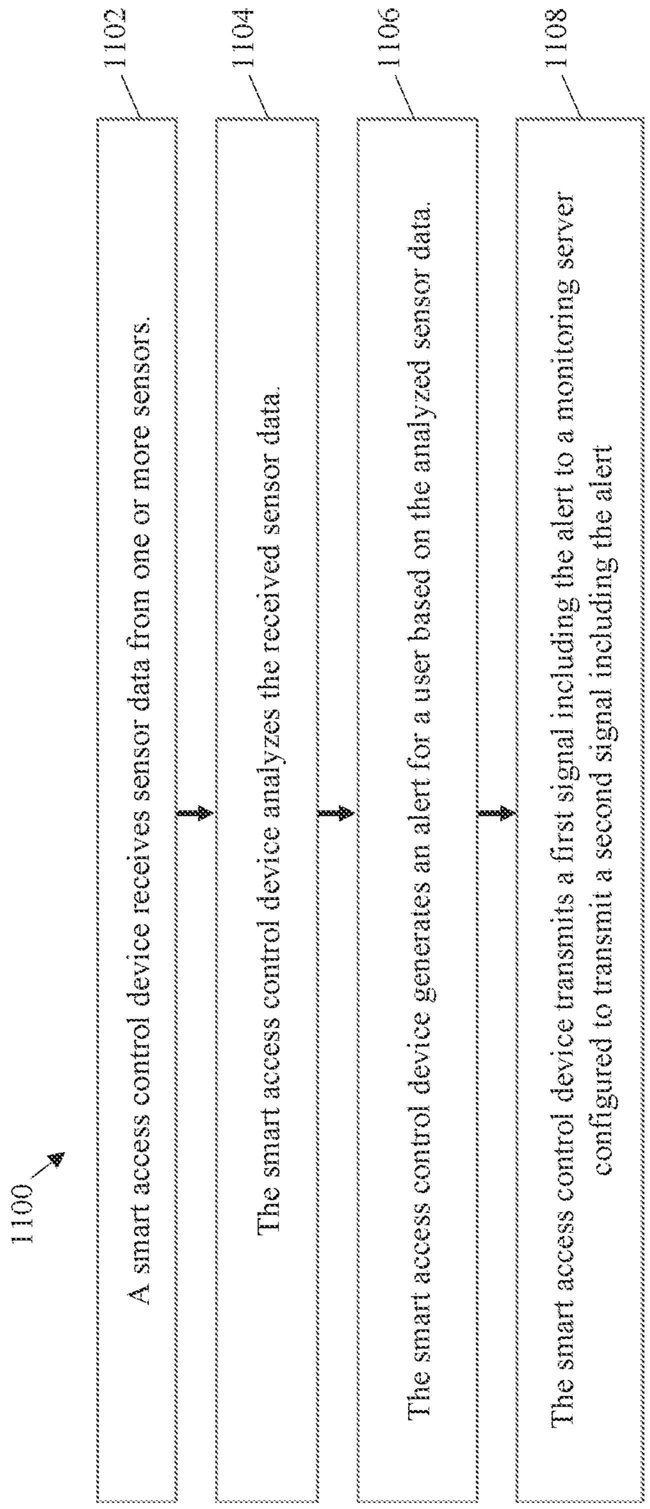
FIG. 11 illustrates an exemplary use case of a security system according to embodiments of the present disclosure.

FIG. 11 illustrates an exemplary use case 1100 of a security system in accordance with embodiments of the present disclosure. At step 1102, a smart access control device can receive sensor data from one or more sensors. In some embodiments, the one or more sensors can include one or more sensors external to the smart access control device and/or one or more sensors within the smart access control device. In some embodiments, a mesh network can be constructed using the smart access control device and the one or more sensors. In some embodiments, the smart access control device can include a lock, a speaker, a battery, one or more antennas, and/or one or more sensors, e.g., a keypad, a motion detector, a camera, and a microphone. In some embodiments, the smart access control device and one or more external sensors can include a backup power system, such as a battery.

At step 1104, the smart access control device can analyze the received sensor data. In some embodiments, the smart access control device can analyze the received sensor data to determine the source of the sensor data, the type of the sensor data, the content of the sensor data, and/or any other suitable characteristic associated with the sensor data.

At step 1106, the smart access control device can generate an alert for a user based on the analyzed sensor data. In some embodiments, the alert can include a fire, smoke, a flood, a gas leak, a medical emergency, and/or a request from a person to gain access to the area. In some embodiments, the user can include a resident living in the area, a manager managing the area, and/or an operator of a monitoring station monitoring the area.

At step 1108, the smart access control device can transmit a first signal, including the alert, to a monitoring server configured to transmit a second signal, including the alert. In some embodiments, the first signal can also include at least a portion of the sensor data. In some embodiments, the smart access control device can transmit the first signal to the monitoring server using a cellular network, an ethernet connection, a WiFi network, the Internet, and/or a local area network. In some embodiments, the monitoring server can transmit the second signal including the alert and/or at least a portion of the sensor data to a user. In some embodiments, the monitoring server can transmit the second signal to the resident and/or the manager. In some embodiments, the dynamic monitoring server can transmit the second signal to the operator of the monitoring station and the resident and/or the manager. In some embodiments, when the resident and/or the manager responds to the alert with a request to transmit the second signal to the operator of the monitoring station, or if the resident and/or the manager fails to respond to the alert within a predetermined time, the monitoring server can transmit the second signal to the operator of the monitoring station. In some embodiments, the predetermined time can be any amount of time, e.g., 30 seconds, 1 minute, 10 minutes, 15 minutes, 30 minutes, 1 hour, 2 hours, 6 hours, 12 hours, or any other suitable time for the situation. In some embodiment, the predetermined time can vary depending on the situation.

In some embodiments, the person requesting access to the area can enter his/her identification information using the smart access control device. For example, the person can type his/her identification information on the keypad of the smart access control device. In another example, the person can speak his/her identification information into the microphone of the smart access control device. In some embodiments, the resident, the manager of the area, and/or the operator of the monitoring station can grant access to the person requesting access to the area.

In some embodiments, one or more of the sensors can record an activity of the person, when the person is in the area. In some embodiments, the one or more of the sensors can include a video recorder and/or a voice recorder. In some embodiments, the smart access control device can transmit the recorded activity of the person to a monitoring device. In some embodiments, the recorded activity can be a live feed. In some embodiments, the monitoring device can be a mobile device.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method, comprising:

detecting, by a sensor of a smart access control system, a signal from a mobile device of a person, the signal generated based on an interaction with an application executing on the mobile device by the person;

sending, by the smart access control system, first information based on the detected signal to a server;

receiving, by the smart access control system, second information from the server, the second information indicating whether to allow or deny access to a first area; and enabling or preventing, by the smart access control system, the access to the first area based on the second information.

2. The method of claim 1, wherein the second information is based on a database of authorized users maintained by the server.

3. The method of claim 2, wherein the smart access control system comprises a plurality of access control devices configured to enable or prevent access to respective areas of a plurality of areas based on the database, wherein the plurality of areas includes the first area.

4. The method of claim 1, further comprising:
monitoring, by the sensor, the first area.

5. The method of claim 1, further comprising:
receiving, by the smart access control system, personal identification information associated with the person; and
sending, by the smart access control system, the personal identification information to the server.

6. The method of claim 1, further comprising:
analyzing, by the smart access control system, the signal.

7. The method of claim 6, further comprising:
sending, by the smart access control system, an alert to another device based on the analysis of the signal.

8. A non-transitory computer-readable storage medium, the computer-readable storage medium including instructions that when executed by a processor, cause the processor to:
detect, by a sensor of a smart access control system, a signal from a mobile device of a person, the signal generated based on an interaction with an application executing on the mobile device by the person;
send, by the smart access control system, first information based on the detected signal to a server;
receive, by the smart access control system, second information from the server, the second information indicating whether to allow or deny access to a first area; and
enable or prevent, by the smart access control system, the access to the first area based on the second information.

9. The computer-readable storage medium of claim 8, wherein the second information is based on a database of authorized users maintained by the server.

10. The computer-readable storage medium of claim 9, wherein the smart access control system comprises a plurality of access control devices configured to enable or prevent access to respective areas of a plurality of areas based on the database, wherein the plurality of areas includes the first area.

11. The computer-readable storage medium of claim 8, wherein the instructions further cause the processor to:
monitor, by the sensor, the first area.

12. The computer-readable storage medium of claim 8, wherein the instructions further cause the processor to:
receive, by the smart access control system, personal identification information associated with the person; and
send, by the smart access control system, the personal identification information to the server.

13. The computer-readable storage medium of claim 8, wherein the instructions further cause the processor to:
analyze, by the smart access control system, the signal.

14. The computer-readable storage medium of claim 13, wherein the instructions further cause the processor to:
send, by the smart access control system, an alert to another device based on the analysis of the signal.

15. A smart access control system, comprising:
a server; and
a plurality of access control devices, respective ones of the access control devices associated with respective ones of a plurality of areas,
wherein a first access control device of the plurality of access control devices is configured to:
receive a signal from a sensor, the signal generated based on an interaction with an application executing on a mobile device by a person;
send first information based on the detected signal to a server;
receive second information from the server, the second information indicating whether to allow or deny access to a first area of the plurality of areas associated with the first access control device; and
enable or prevent the access to the first area based on the second information.

16. The smart access control system of claim 15, wherein the second information is based on a database of authorized users maintained by the server.

17. The smart access control system of claim 16, wherein the plurality of access control devices are configured to enable or prevent access to the respective area of the plurality of areas based on the database.

18. The smart access control system of claim 15, wherein the sensor is configured to monitor the first area.

19. The smart access control system of claim 15, wherein the first access control device is configured to analyze the signal.

20. The smart access control system of claim 19, wherein the first access control device is configured to send an alert to another device based on the analysis of the signal.

* * * * *